United States Patent [19]

Durbin

[11] Patent Number: 4,680,962
[45] Date of Patent: Jul. 21, 1987

[54] FLUID FLOW RATE AND DIRECTION MEASURING APPARATUS

[76] Inventor: Enoch J. Durbin, 246 Western Way, Princeton, N.J. 08540

[21] Appl. No.: 572,433

[22] Filed: Jan. 20, 1984

[51] Int. Cl.[4] ............................................. G01F 1/56
[52] U.S. Cl. .................................... 73/189; 73/861.09
[58] Field of Search ............................. 73/189, 861.09

[56] References Cited

U.S. PATENT DOCUMENTS 4,345,478  8/1982  Barat ..................................... 73/189
4,471,654  9/1984  Du Vall ................................ 73/189

Primary Examiner—Herbert Goldstein
Attorney, Agent, or Firm—Marvin H. Kleinberg

[57] ABSTRACT

A fluid flow measuring device which does not disturb the fluid flow, in one embodiment is responsive to flow in each of three orthogonal directions. A central electrode carrying ionizing needle electrodes is combined with a concentric and coaxial open ion collecting structure that establishes a voltage gradient to the central electrode. The preferred embodiment employs a plurality of rings supported by rods that are parallel to the central electrode. The rings are subdivided into quadrants by insulating segments. Displacement of the ion cloud, resulting from fluid motion, is directly related to fluid velocity and can be resolved into components in the desired directions. Alternative embodiments include cylindrical sensors that can be oriented in the fluid stream for non interference with the rate and direction of flow.

37 Claims, 15 Drawing Figures

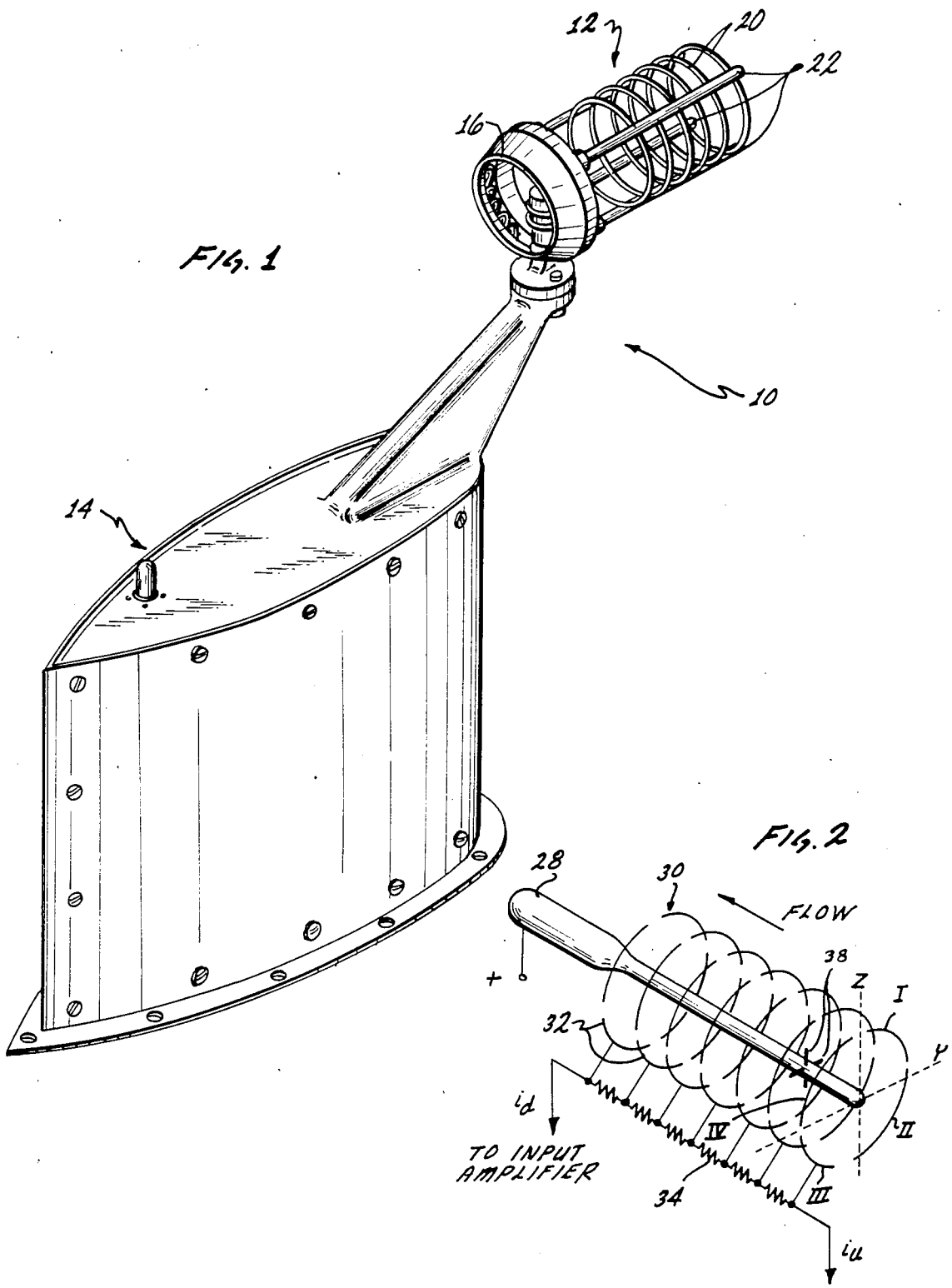

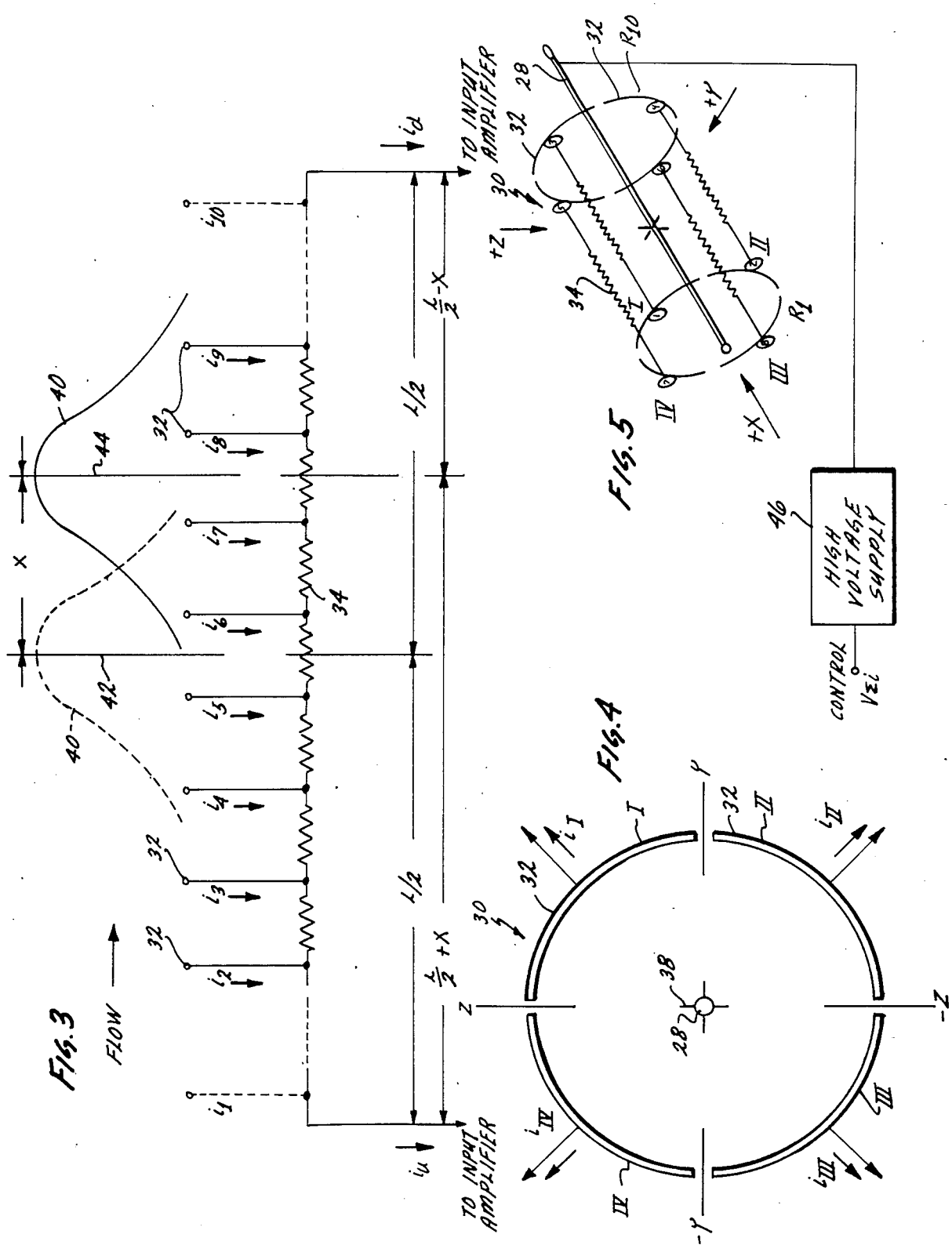

FLUID FLOW RATE AND DIRECTION MEASURING APPARATUS

BACKGROUND OF INVENTION

1. Field of Invention

This invention relates to fluid flow measuring devices and, more particularly to an ion beam anemometer capable of measuring, unobstrusively and without disturbance, the magnitude and direction of fluid flowing therethrough.

2. Description of Prior Art

This invention is related to and derived from the prior patents of applicant U.S. Pat. No. 3,470,741, issued Oct. 7, 1969, and U.S. Pat. No. 3,831,445, issued Aug. 27, 1974. Other relevant prior art includes U.S. Pat. No. 4,331,037, issued May 25, 1982, and a publication by the applicant and a colleague entitled "An Airspeed Vector Sensor For V/STOL Aircraft" by Enoch Durbin and Tad McGeer, which was delivered Dec. 3, 1980 at an AIAA meeting in Colorado Springs, Colo.

For some time a technique for air speed sensing, using the ion beam created by a positive corona discharge, has been under development. The technique employs ions in transit across an electrode gap which may be deflected by airflow during the transit. By measuring the deflection, one can determine the flow rate.

In modern aircraft, the motion of the vehicle is determined by the forces acting upon it. In aircraft, the predominant forces are aerodynamic and the magnitude and direction of these forces are determined by the shape of the craft, and by the speed and angle of the incident airflow. One must know the forces on the aircraft if it is to be controlled. It is therefore necessary to have available to a pilot, or to an automatic control system, specific velocity information which can be resolved with respect to the three axes of the vehicle.

It is particularly important to have such velocity vector information in the low speed maneuvering of helicopters and V/STOL aircraft where optimum performance is achieved in a narrow speed range since a 1 or 2 knot error in the rotation speed (Vr) of a heavily loaded helicopter can incur significant penalties in payload and distance required to clear obstacles. Complete velocity information is often needed for safe as well as for optimum flight.

On some aircraft of the V/STOL type, sideslip must be held within a fairly narrow band during hover and transition to avoid exceeding lateral control power. However, the requirement is not limited to low speed flight. It is also necessary, for example, in the takeoff and initial climb of large, multi-engine aircraft, in which the optimum rotation speed (Vr) and climb angle of attack are important, to have precisely defined quantities.

In prior art, most aircraft have used a pitot-static system to provide velocity information. This is primarily a pressure sensing system which can be simple and unobtrusive. So long as aerodynamic angles are small, velocities exceed 30 to 40 knots, and the structure can be in the undisturbed stream, the apparatus is relatively error-free. At large angles, the errors become significant and at low speeds the device is substantially insensitive.

A major shortcoming of such a device is that only a single component of velocity can be sensed. The addition of flow angle vanes can resolve the other orthogonal components but the sensitivity of these is also reduced at lower speeds if inertial and frictional forces are of the same order of magnitude as the aerodynamic forces.

What is needed and what is supplied by the present invention is an airspeed vector sensor capable of operating over the whole of the flight envelope without disturbing the airstream. Such a device should be insensitive to environmental variation and, preferably linear in response. It should be simple, sturdy, and sufficiently "clean" to mount onto an airframe.

In the prior patents of applicant noted above, fluid velocity meters were disclosed which measured the ion drift of an ionized fluid to determine the flow. In U.S. Pat. No. 3,470,741, several embodiments were disclosed including embodiments requiring the translation of an ion source to compensate for the ion drift resulting from fluid flow.

In alternative embodiments, an ion source was fixedly mounted with a planar collector electrode that was capable of determining the amount of drift in either one or two directions in a plane orthogonal to the direction of ion drift. In part of U.S. Pat. No. 3,831,445, an alternative structure was provided which was capable of varying the electric field intensity to compensate for changes in ion mobility.

In the recently issued patent to DuVall U.S. Pat. No. 4,331,037, and assigned to a licensee of the inventor, a fluid movement measuring device was provided in which an ion beam was provided, together with a segmented detector, to detect fluid movement in directions transverse to the direction of ion flow. The ionizing means was located in a protected chamber and a protected fluid flow path was provided.

In the AIAA paper delivered by applicant and a colleague (noted above), a combination including an axially sensitive flow sensor and a transversely sensitive flow sensor was discussed in general terms. The theoretical support for such apparatus was developed without disclosing the apparatus from which experimental results to verify the theory had been derived. Footnoted therein was the master's thesis of Steve Weatherspoon, "A Flow Vector Sensitive Ion Beam Anemometer", filed in the Princeton Department of Aerospace and Mechanical Sciences, which taught that a transverse flow device could be linear and relatively insensitive to environmental change at high current.

BRIEF SUMMARY OF INVENTION

In a preferred embodiment of the present invention, an open structure sensor is provided in which a central, linear rod carries one or more needle electrodes which are operated, through corona discharge, to generate ions from the surrounding fluid. In most instances, the fluid will be air, although the device can be utilized in any ionizable fluid, whether it be liquid or gaseous. Concentric and coaxial with the central rod is an ion capturing structure, preferable a plurality of circular rings arranged in a cylinder.

Each of the rings is divided into quadrants through the use of insulating segments. Four support rods, parallel to the central rod, are in contact with corresponding quadrants of the several rings. The support rods may include a resistive element between the quadrants of the rings, with the taps at opposite ends of the structure.

The sensor is fixedly mounted to the airframe and oriented so that the direction of the axis of the central rod is considered the X or forward direction. The quadrants are then separated by the XZ and XY planes. Four needle electrodes extend from the central rod in the YZ plane and are mutually orthogonal, oriented in the Y or lateral and Z or vertical directions.

Since the preferred embodiment is to be used on an aircraft in which forward speeds will generally be much greater than reverse speeds, the needle electrodes need not be located at the mid-point of the central rod but may be placed near the forward end of the sensor.

At rest, application of a sufficiently high voltage between the central electrode and the ion collecting rings will result in a corona discharge at the needle electrodes and the establishment of an electric gradient field between the central rod and the ring electrodes. Under the influence of the field, the ions will drift radially toward the collecting rings in a generally circular cloud, being dispersed by the mutual repulsion of the individual ions.

Measurement of ion currents can signal the location of the circumferential area of the ring where the "mean" ions impinge. Fluid motion in the axial direction displaces the ions axially to other rings and the relative currents can be used to compute the amount of beam displacement, which is directly related to fluid flow velocity.

To determine the transverse fluid flow components, the ion currents in adjacent concentric segments are summed and compared to the sum of the currents in opposite and adjacent segments. Using a normal sign convention, which considers "up" and "down", as $+Z$ and $-Z$, respectively, and "right" and "left" as $+Y$ and $-Y$, respectively, the quadrants can be defined as "YZ", "$+Y-Z$", "$-Y-Z$", and "$-Y+Z$". Velocity in the Z direction is found by comparing the $-Z$ quadrants to the $+Z$ quadrants. Y velocity can determined by comparing the $+Y$ quadrants with the $-Y$ quadrants.

In the preferred embodiment, a current servo circuit is provided to maintain a constant total ion current. The current from all of the quadrants can be summed to provide the feedback signal for the current servo.

Further, to be useful as an aircraft instrument, it is necessary that the formation of ice on the conductive surfaces be prevented. This is conveniently accomplished by carefully selecting the materials from which the components are made. Resistive heating elements can be added to the support rods without interfering with the ion current measurements. The central rod may be heated through the use of a central conductive core that is electrically isolated, since the outer surface of the rod must be kept at a high voltage to maintain a uniform electric field gradient.

Other alternative embodiments may utilize either a thin disk as a central electrodes or opposed needle electrode for ionizing the fluid. Further, the quadrants may be subdivided into additional, isolated segments and more or fewer concentric rings can be provided. It is important that the rings and their supporting structure create substantially no interference to free fluid flow and that the ion collecting structure should be considered a substantially "open" framework.

Experimental results have suggested that the transverse response can be linear up to a first velocity and, with a change of slope, can be linear to a second maximum velocity. It is believed that the transverse response can either be experimentally calibrated or, through the use of appropriate electronics, the change in slope can be used to provide a linear response over all velocity ranges.

Still other embodiments may dispense with the conductive rings, entirely. An embodiment may employ four rod electrodes surrounding the central electrode. In the preferred embodiment, the rods are at the corners of a square prism whose sides are oriented to be parallel to YZ and XY planes. Alternative versions can increase the number of rods, thereby increasing the linear velocity range. The rods may incorporate a resistive structure so that, as with the rings, the relative location of ion impingement can be identified. Alternatively the rods can be subdivided by insulating segments into "upstream" and "downstream" segments. Each rod can act as one of the quadrants of the preferred embodiment.

In another, alternative embodiment which employs collector rings, each ring can be provided with a resistive element. Rather than subdividing each ring into quadrants, a continuous resistance is provided around the ring with a pair of terminals that are adjacent to each other so that the relative location of the ion impact can be determined on a more or less continuous basis, rather than limiting the information to a quadrant. With the more precise location of area, the Y and Z components can be resolved using more or less conventional mathematical techniques, either with digital or analog computing equipment.

In addition to the sensors which can be fixedly mounted to the aircraft and which cannot interfere with the fluid flow, it is also possible to provide sensors which can be positioned to afford minimal interference with fluid flow. The orientation of the sensor can be determined and utilized to resolve the measured fluid velocities into appropriate velocity vectors.

Similarly, a fixed sensor can be attached to a movable element of the vehicle such as a rotating assembly. Periodically, the sensor will be positioned for minimal interference with the fluid stream. The sensor can be intermittantly sampled at a known orientation or the sensor can be continually monitored and the position of maximum and minimum signal strength noted.

The novel features which are characteristic of the invention, both as to structure and method of operation thereof, together with further objects and advantages thereof, will be understood from the following description, considered in connection with the accompanying drawings in which several preferred embodiments of the invention are illustrated by way of example. It is to be expressly understood, however, that the drawings are for the purpose of illustration and description only, and are not intended as a definition of the limits of the invention.

DESCRIPTION OF THE DRAWINGS

The invention is illustrated, by of example thereof, in accompanying drawings, wherein:

FIG. 1 is a prospective view of a three axis flowmeter adapted for use on a helicopter;

FIG. 2 is a simplified partial schematic representation of a preferred embodiment of a three axis flowmeter;

FIG. 3 is a partial graph partial circuit diagram illustrating the theory of the present invention;

FIG. 4 is a idealized view of a split ring electrode;

FIG. 5 is a sketch which incorporates a simplified schematic of the circuitry of the three axis sensor;

Figure 6:
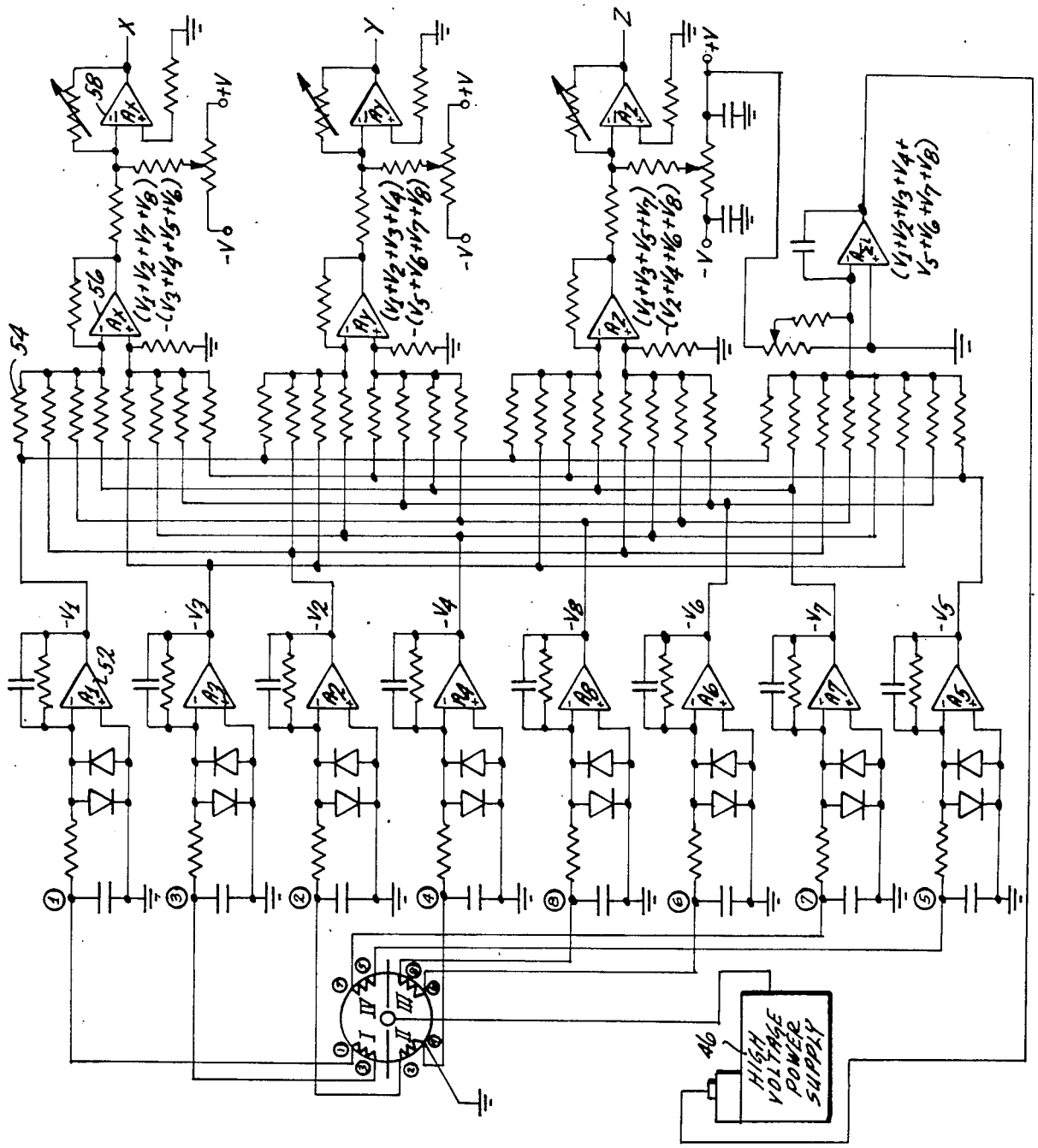
FIG. 6 is a simplified schematic circuit diagram of the system for determining velocity in each of three orthogonal directions, adapted for the use as a velocity sensor on board an aircraft.

Turning first to FIG. 1, there is shown in perspective view, a velocity sensor assembly 10 according to the present invention. The assembly 10 includes a velocity sensor element 12 and a pylon 14 which is streamlined for external mounting on an aircraft such as a helicopter. The pylon 14 contains the electronic subsystem which powers the sensor element 12 and provides appropriate signals to the avionic systems.

As shown in FIG. 1, the velocity sensor element 12 includes a base or housing 16, a central electrode, (as better seen in other figures), a plurality of concentric ion collecting rings 20, and a plurality of support rods 22 to which the rings 20 can be anchored.

The principles of operation of the velocity sensor element 12 can be better understood by reference to the idealized sketch of FIG. 2. In FIG. 2, there is shown a central electrode 28, surrounded by a plurality of concentric rings 30. As shown, each ring 30 is subdivided into quadrants 32. A resistor chain 34 couples the corresponding quadrants 32 of the rings 30 together.

For ease in description, each of the quadrants has been assigned a special designation. As shown in FIG. 4, the quadrants are located within a plane orthogonal to the central electrode 28. If the vertical direction is considered the Z axis and the horizontal direction the Y axis, then quadrant I would be found in the YZ quadrant. Quadrant II occupies the Y−Z quadrant, quadrant III is the in the −Y−Z quadrant, and quadrant IV occupies the −Y+Z quadrant.

The ring quadrants 32 of quadrants III are shown connected together by the resistor chain 34. Relative to the direction of fluid flow, the upstream current would be $i_u$ and the downstream current would be $i_d$. The rings 30 are oriented so that the insulating segments lie along the Y and Z axes.

Four ionizing needle electrodes 38 are mounted to the central electrode 28. These electrodes 38 are aligned with the Y and Z axes. Although the ring quadrant segments 32 are shown separated in FIGS. 2 and 4, it is understood that these are mechanized as conductive rings with an insulating segment interposed between adjacent conductive segments.

A source of high voltage, approximately 10 kv, is applied to the central electrode 28. This voltage has been found to be sufficient to cause a corona discharge at the ionizing needle electrodes 38, thereby ionizing the gas that surrounds the central electrode 28. The ion collector rings 30 are connected to a summing junction (not shown) which completes the electrical circuit. Accordingly, a voltage gradient is created, resulting in a flow of positive ions from the points of the needle electrodes 38 to the ion collecting rings 30.

If the voltage is controlled to maintain a constant current, no "sparking" or arcing will occur. In the absence of a flow of air along the axis of the central electrode 28, the ions collect in a cylindrical cloud, impinging, for the most part, upon the collector ring 30 closest to the needle electrodes 38. The mutual repulsion of charged particles causes some spreading of the ion cloud and a gaussian distribution will be observed at the collecting rings 30.

FIG. 3 illustrates the effects of fluid velocity in the direction of the axis of the central electrode 28. As shown in FIG. 3, the ion current distribution would assume a gaussian or bell curve. Under conditions of zero flow, the center of the curve 40 would be along the vertical line 42. However, under fluid flow, as indicated by the arrow in the horizontal direction, the center of the curve 40 is shown displaced by an amount "X" and is now centered on the vertical line 44.

The segments 32 of the collecting rings 30 are shown schematicaly coupled together with the resistive chain 34 of FIG. 2. As illustrated, one could assume some 10 rings each of which provide a current increment $i_n$ where "n" has a value from 1 to 10.

The total axial distance L, in the resting state would be divided into 2 segments, each of length L/2. With the displacement (caused by the fluid flow) of X, then the location of the center of the curve would be L/2+X from the leading or "up stream" rings and a distance of L/2−X from the trailing or "downstream" rings. A simple resistive network finds the "mean". An increment of current is divided by the resistive circuit so that the "upstream" current is $$\frac{i_u}{i_u + i_d} = \frac{\frac{L}{2} + X}{L} = \frac{L + 2X}{2L}$$

while the downstream current, $$\frac{i_d}{i_u + i_d} = \frac{\frac{L}{2} - X}{L} = \frac{L - 2X}{2L}.$$

Generally, all of the quantities but X are easily measured or known. Accordingly, the quantity X can be found as a function of the ion current, and the total length of the circuit.

As seen in FIG. 4, air flow in directions transverse to the axis of the central electrode 28, would tend to cause the ion cloud to be displaced in the plane of figure. The transverse flow causes the ion beam to impinge unequally on the segments 32 of collecting ring 30. For a flow in the −Y (corresponding to motion in the +Y direction), direction, for example, currents in quadrants I and II would be subtracted from currents in quadrants III and IV. Flow in the −Z direction could be measured by subtracting currents in quadrants I and IV from currents in quadrants II and III.

In FIG. 5, a simplified convention for identifying the ring segment and ion current resistive dividers is shown, together with the orthogonal axis upon which the system is based. According to the convention, the terminals representing "upstream" ends of the resistive dividers are "1" for quadrant I, "2" for quadrant II, "8" for quadrant III and "7" for quadrant IV. At the "downstream" end, the terminal in quadrant I is "3", terminal "4" is in quadrant II, terminal "6" is in quadrant III and terminal "5" is in quadrant IV.

Using these conventions, a circuit diagram is shown in FIG. 6 which includes a plurality of amplifiers 52 which convert current to voltage. The amplifiers 52 are connected through summing-resistor stages 54 to differential amplifiers 56. The outputs of the differential amplifiers 56 are applied to inverting amplifiers 58 at the output stage.

The appropriate electrode terminal designations are indicated at the inputs to the input amplifiers 52. As shown, the summing stage 54 feeding the first differential amplifier 56, (Ax) combines the outputs of amplifiers A1, A2, A7 and A8 and subtracts from those the combined outputs of amplifier A3, A4, A5 and A6.

The output signal of the Ax differential amplifier 56 is then a combination of V1+V2+V7+V8 minus a combination of V3, +V4, +V5, +V6. This quantitity is applied to the inverting amplifier 58, and the output signal is representative of the X or forward velocity component.

Similarly, the Y and Z quantities can also be determined. The determination of the "mean" area of impact of the ion cloud upon the ion collecting rings results from an analysis of the resistance divider network. The ion cloud, displaced by the fluid motion (or, sensor motion which is the full equivalent) will impinge on one or more of the electrode rings on or more of the quadrants thereof, depending upon velocity of fluid motion.

The resistive network becomes a ladder in which the ion currents are divided into an "upstream" current and a "downstream" current. Since the voltage drop across the two legs of the network must be equal, and since the currents can be measured and the total resistance of the network is known, it can be seen that the current in each branch is a function of the resistance of that branch.

With the idealized schematic of FIG. 5, it can be seen that a vector or resultant fluid velocity will result in a displacement of the ion cloud which, under the influence of the voltage gradients, will move to an area within the detector. Ion current will be detected in more than one detector ring and in more than one sector of the rings. Accordingly, the several voltage divider networks can viewed as one overall network. To aid in the computation as shown in FIG. 6, the conventions illustrated in FIG. 5 have been adopted.

In order to maintain the ion current constant, a feedback signal, representing the sum of all of detected ion currents is provided. This quantity is represented by $\Sigma_\iota$ which is applied to the high voltage power supply 46.

Figure 7:
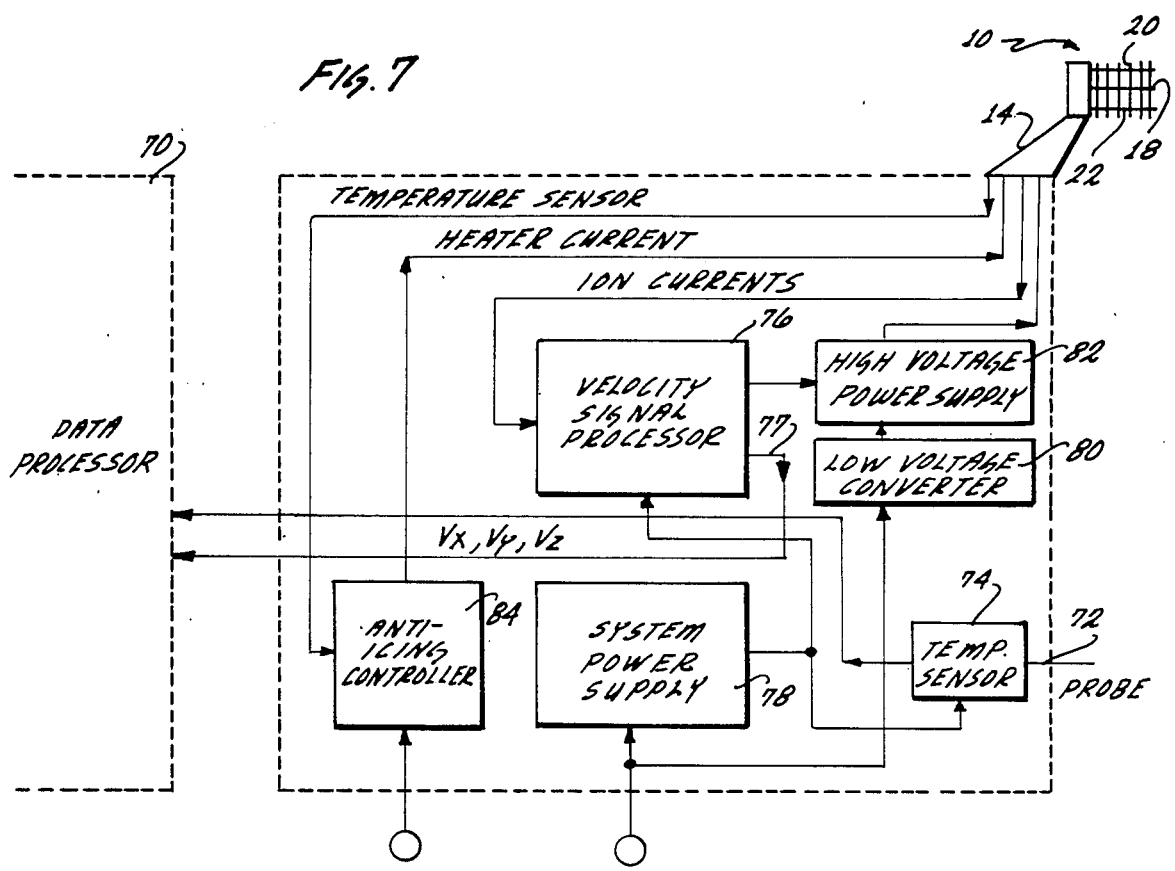
FIG. 7 is a block diagram of a three axis velocity sensor electronic subsytem.

Turning next to FIG. 7, there is shown a block diagram of a system which provides velocity signals to an onboard data processor 70. The data processor 70 also receives ambient temperature information from a probe 72 which is connected to a temperature sensor 74. The effects of temperature, generally, must be taken into consideration when measuring the fluid flow velocity, which is interpreted as the velocity of the vehicle.

The velocity sensor assembly 10 is shown connected electrically to the electronics package that is carried within the pylon 14. The velocity signal processor 76 is shown in greater detail in FIG. 6. and is indicated here by a block. As can be seen, the velocity sensor assembly 10 provides ion current signals along a cable 77 into the velocity signal processor 76.

A low voltage system power supply 78 is connected to an availiable source of power, in this embodiment, the aircraft 28 volt, DC power system. The low voltage system power supply 78 supplies operating power to both the temperature sensor 74 and the velocity signal processor 76. The basic power supply from the aircraft is also applied through a low voltage converter 80, which reduces the 28 volt DC power to approximately 18 volts, to power the high voltage power supply 82. This high voltage power supply 82 may be identical to the high voltage power supply 46, of FIGS. 5 & 6, above.

An anti-icing controller 84, is powered by a different power source within the aircraft. In the preferred embodiment, the aircraft's 115 v., 400 Hz power supply generates a current which is applied to the velocity sensor assembly's heating system. A temperature sensor is therefore included in the velocity sensor assembly, to provide a signal to the anti-icing controller 84, controlling its activities. In the alternative embodiments, a thermal heat source could be conductively coupled to the sensor device.

In operation, the high voltage power supply 82 creates a 10,000 volt voltage gradient between the central electrode 18 and the ion capture rings 20. The ion currents developed are then applied to the velocity signal processor 76 which generates voltage signals corresponding to and representative of the velocities in each of the three orthogonal co-ordinates X, Y, & Z. Here X represents velocity along the longitudinal or roll axis of the aircraft, Y represents the velocity in the lateral direction along the pitch axis orthogonal to the longitudinal axis, and Z represents velocity in the vertical direction or the yaw axis.

These voltage signals are applied to the data processor 70 which can utilize them to form output displays for the pilot. Further, the data may be utilized in any navigational system that might be onboard with suitable coordinate transformation. While most modern aircraft are equipped with inertial guidance systems, the velocity information can enable the computation of such quantities as windspeed and direction and angle of attack.

Figure 8:
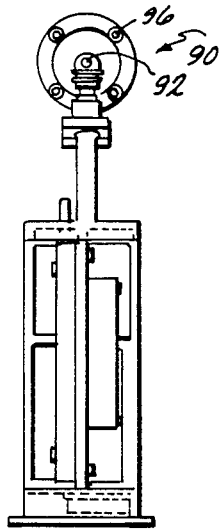
FIG. 8 is an end view of a preferred embodiment.

Turning next to FIG. 8., there is shown, in an end view, the velocity sensor assembly of a preferred embodiment and the electronics package which powers the assembly and processes the signal information returned from it. The figure has been included primarily to illustrate a particular mechanization of the invention and demonstrates that the necessary electronic systems can be packaged in a convenient module to fit within the pylon 14 of FIG. 1.

Figure 9:
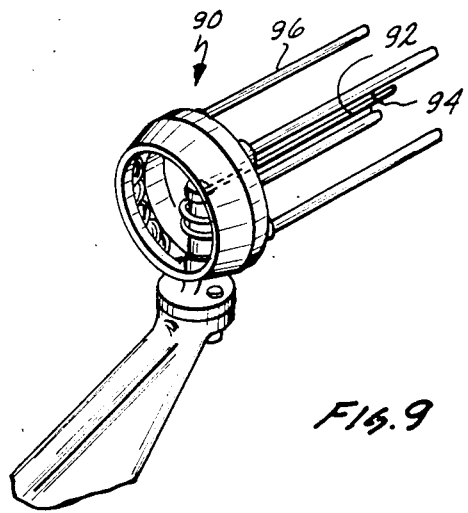
FIG. 9 is a simplified perspective view of an alternative embodiment, employing a plurality of ion collecting rods.

FIG. 9 is a perspective view of an alternative velocity sensor element 90, which differs from the preferred embodiment in that the ion capture rings are omitted. The assembly 90 of FIG. 9 includes a central electrode 92 together with ionizing needle electrodes 94, surrounded by a plurality of conductive rods 96, which are used for ion capture. As in the preferred embodiment, the electric field gradient is created between the rods 96 and the central electrode 92. The ion cloud generated would be in a less uniform, but nevertheless high voltage gradient field, which would cause the ions to flow toward the rods 96.

In this embodiment, each rod 96 may be considered the full equivalent of all of the ring sectors located within a quadrant. The resistivity of the conductive rods 96 can establish a resistive ladder which can be used to determine the area of ion impact, utilizing the circuitry similar to that shown in FIG. 6.

Figure 10:
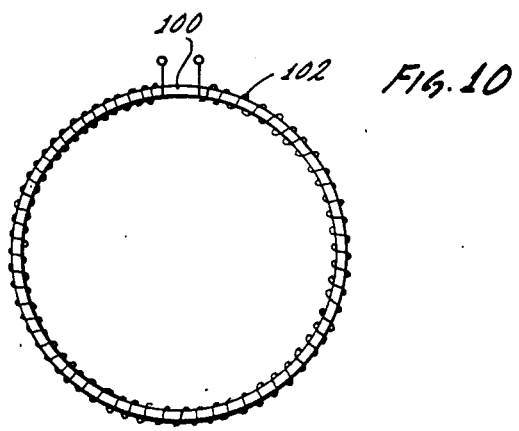
FIG. 10 is a alternative collecting ring, which incorporates a resistive element about its circumference.

FIG. 10, is an illustration of an alternative ion capture ring 100, which can be fabricated of a substantially non-conductive material. A conductor 102 can be wrapped (as shown) or deposited around the circumference of the ring 100. The conductor element, when receiving an ion current, divides the ion current in the same fashion as illustrated in connection with the earlier figures.

In this embodiment, the mean location of ion impingement would be determined with respect to a point on the circular ring 100. This would be the equivalent of the sectors in the preferred embodiment, and would provide a slightly more precise indication of the mean area of ion impingement with respect to the YZ plane.

Figure 11:
FIG. 11 is an alternative ion collecting rod employing a resistive element extending throughout its length.

Similarly in FIG. 11, there is shown a non conductive rod element 104 with a conducting resistive element 106 extending the length of the rod. As with the element of FIG. 10, the resistive element 106 can be a wire (as shown) or can be a conductive path deposited or otherwise placed on the non-conductive rod 104. The rod would then provide a more uniform determination of the area of ion impingement then would the plurality of rings, and would be utilizable in the embodiment of FIG. 9.

Figure 12:
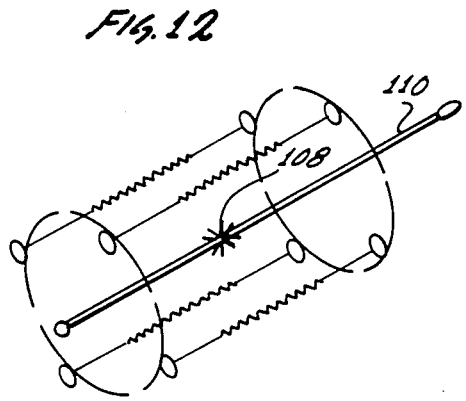
FIG. 12 is a sketch of an alternative version of the sensor of FIG. 5 employing a plurality of needle electrodes.
Figure 13:
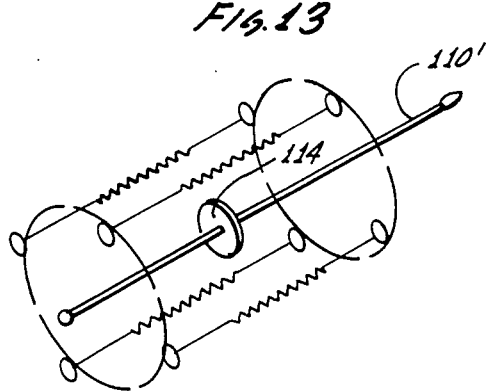
FIG. 13 is another alternative version of the sensor of FIG. 5, employing a disk electrode.

FIGS. 12, and 13, are substantially identical to FIG. 5 and merely illustrate alternative structures that may be employed as the ionizing needle electrodes. In FIG. 12, a plurality of individual electrodes 108 are shown uniformly spaced around the periphery of a central electrode 110. In FIG. 13, a central electrode 110' carries a thin disc electrode 114, which is provided with a knife edge to facilitate the corona discharge.

Figure 14:
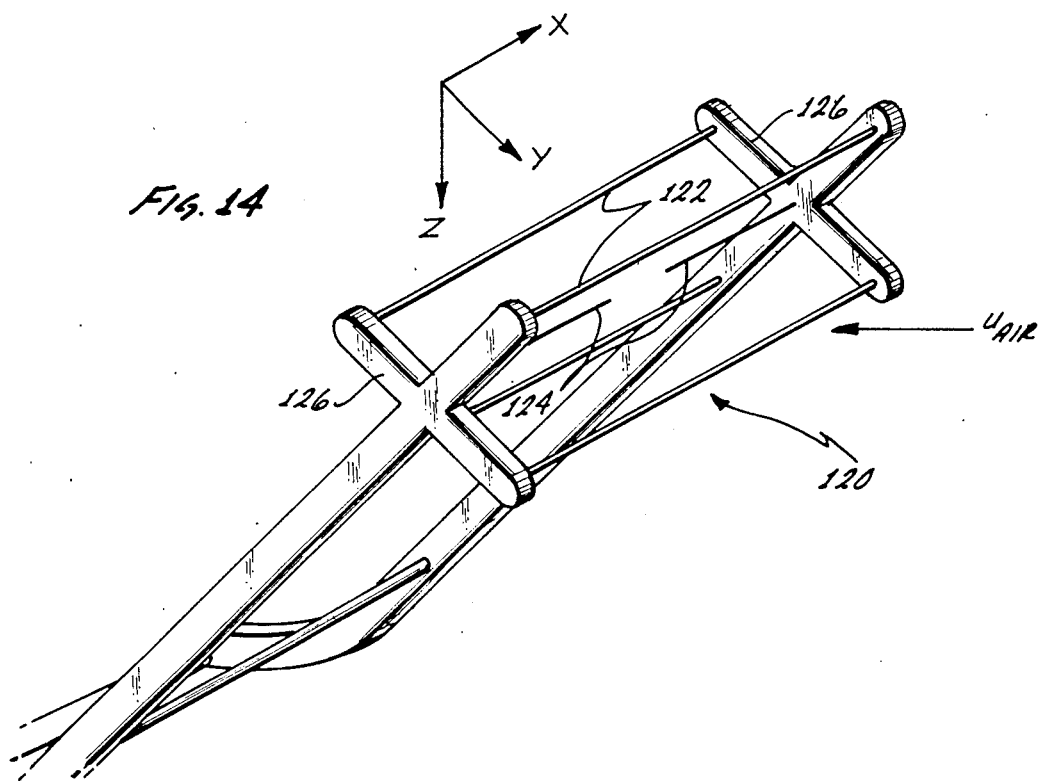
FIG. 14 is yet another alternative embodiment of a sensor employing ion collecting rods.

Turning next to FIG. 14, there is shown yet another alternative embodiment of a velocity sensor 120 according to the present invention in which the ion collecting electrodes are rods 122 surrounding a central ion source. In a manner suggested by the prior patent of applicant U.S. Pat. No. 3,831,445, a pair of opposing needles 124 are used as ionizing electrodes and the cylindrical electrode of FIG. 1 of the patent is replaced by the four rod electrodes 122, arranged as in FIG. 9. In this embodiment, the rod electrodes 122 are mounted between a pair of end pieces, 126 generally cruciform in shape, which include conductors to each of the rods 122.

Each of the rods 122 is divided into two segments by an insulating strip 126, similar to the technique utilized with the split collector rings of the preferred embodiment. A plane defines the point of division of the rods and also separates the opposed ionizing needle electrodes 124.

With the sensor 120 at rest, the ion cloud is generated in a generally gaussian distribution from each of the needles 124 and, under the influence of the electric gradient, drifts to the collector rods 122. In the absence of motion, the ion current from all of the rod segments are equal. The power supply can be adjusted to shift the "zero" slightly to compensate for any irregularities in the needle electrode.

The X or forward direction in this embodiment would be along the axis of the electrodes 122 while the Y and Z direction would be in a plane orthogonal thereto. Because of the substantially gaussian distribution of the ion cloud as it is generated from each of the needles 124, the differencing technique used in earlier embodiments can be adapted to this embodiment as well. For example, the velocity component in the X direction would be determined by subtracting the "upstream" ion currents from the "downstream" ion currents.

Similarly, the Y direction would be determined by subtracting the ion currents for the upper and lower electrodes on one side of the device from the ion currents of the upper and lower electrode on the other side of the device. Finally, the Z velocity would be ascertained by subtracting the ion currents from the upper pair of electrodes from the ion currents in the lower pair of electrodes.

Figure 15:
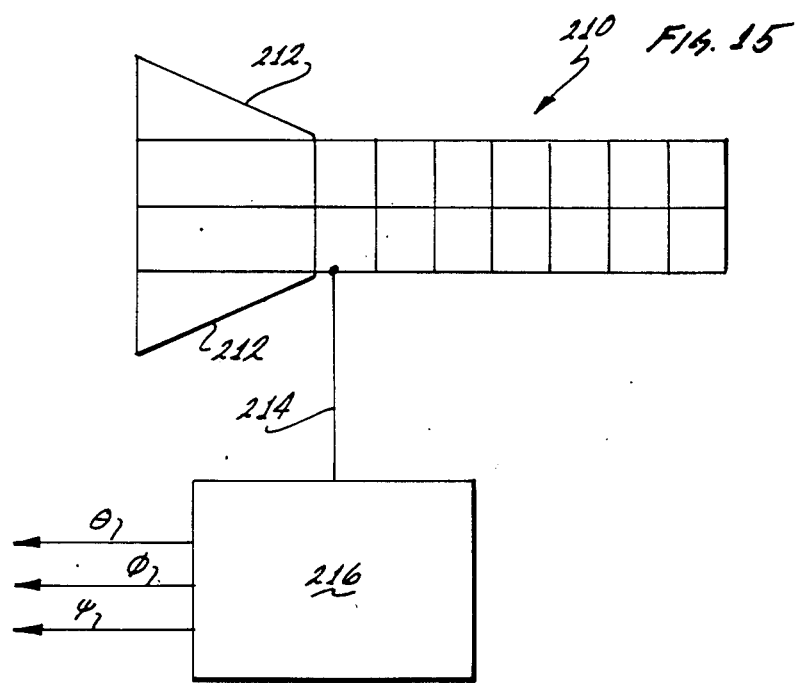
FIG. 15 shows an embodiment capable of being positioned for minimum interference fluid flow.

In FIG. 15 there is shown a "free-flying" embodiment of the sensor of the present invention. In this embodiment, the sensor 210 is provided with stabilizing fins 212 which in an airstream, would tend to keep the sensor 210 oriented to provide minimal resistance to the airstream. A mounting member 14 connects the sensor 210 to an omni directional mounting fixture 216 which include apparatus (not shown) that can resolve the angle to which the sensor 210 is pointing into polar coordinate angles relative to the airframe and the reference axes thereof. As noted above, these may be considered the roll, pitch and yaw axes. The mount 216 would signal theta ($\theta$), the angular displacement from the roll axis, phi ($\phi$), the angular displacement from the pitch axis and psi ($\psi$), the angular displacement from the yaw axis. These angular signals, wherein properly processed, would give velocity vector information suitable for use by the aircraft instrumentation.

It is noted that FIG. 15 illustrates a "passive" device which is appropriately oriented by the airstream. This embodiment while it can provide velocity vector information, does not need the sophistication of a sensor which detects both axial and lateral flow and, accordingly, could utilize applicant's prior art velocity sensor noted above. An active positioning system is also possible which drives the sensor to an orientation in which the airstream was substantially undisturbed by the presence of the sensor.

In such a system the Y and Z velocity information is part of a feedback network which utilizes electromechanical servo devices to reposition the sensor. Appropriate synchro resolvers on the pitch and yaw axes would provide information as to the direction of the fluid flow velocity vector. The magnitude would be determined from the S or axial direction of the sensor, which in the preferred embodiment of the present invention can signal values over a greater range of velocities.

Other variations will become obvious to those skilled in the art including, for example, the provision of eight ion collecting electrodes equidistant from each other, and generally forming the edges of a regular octagon. The supporting members for such an arrangement can be circular and the collecting electrode can be supported at both ends in a structure similar to FIG. 13. Alternatively, the electrodes can be cantilevered as in the embodiment of FIG. 10.

The common element of the several embodiments is the utilization of an open structure which is substantially transparent to fluid motion and which creates an ion "cloud" at the center of a symmetrical structure which can create a reasonably uniform voltage gradient to collectors that are substantially equidistant from the center and from each other. The collectors can either be a plurality of circular electrodes arranged in a cylinder or, alternatively, a plurality of parallel rods. The ring electrodes create a more uniform voltage gradient by the elongated rods appear to be easier to fabricate into a sensor.

The collecting electrodes can be subdivided through the use of insulating segments or may utilize a non-conductive substrate with a conductive coating. Alternatively, the conductive coating may exhibit substantial resistance and thereby become part of a resistive network.

In operation, a substantially open, velocity sensor is provided, which ionizes the ambient fluid medium and subjects the ions thus formed to a high voltage gradient. This causes a ion drift to a collector structure. The collector is arranged in a resistive network so that the relative location of impingement of ions can be identified. While the ions initially have a statistical distribution, they may be considered to have an average or "mean" location with respect to the arrival at the collector electrodes. Such a location can be readily determined from a measurement of the ion currents, knowing the resistance of the network.

In a preferred embodiment, the collector structure is further subdivided into segments that collect ions within a quadrant. Relative lateral motion of fluid and sensor, results in a skewed distribution of ions which can be resolved by comparing the ion currents in the various quadrants.

The sensor has a generally cylindrical envelope and is oriented so that motion along the longitudinal axis of the vehicle can be determined by displacement of the ions in the axial direction. Velocity in the horizontal plane would be detected by a skewed distribution of ions favoring some quadrants over others. Simularily, motion in the vertical direction would also be detected by preferential collection of ions within some of the quadrants.

Since the differences in ion currents are a direct measure of fluid velocity or vehicle velocity, (assuming a stationary fluid) the location of the ion impingement can be resolved into general components, each representing velocity in a different direction.

In the prefered embodiment, the instrument includes a central electrode with four ionizing needle electrodes aligned in the vertical and horizontal directions. A plurality of circular ion collecting rings are arranged in a cylinder and can be supported by a plurality of rod elements. A high voltage is applied to a central electrode and the collector rings are maintained at a common reference potential. Resistance networks enable a measurement of current division as a function of the relative location of the ion beam impingement on the collectors.

In the preferred embodiment, adapted for use in aircraft, a de-icing system is employed which utilizes resistive heating of the collector rings and conductive heating of the central electrode. The ion currents are summed to provide a feedback to the high voltage power supply, to maintain a constant ion current flow.

Under the conditions of operation that would normally be encountered, it is expected that the ion drift rate in a potential gradient of 10,000 volts, would be approximately 50 meters per second, which translates to approximately 112 miles per hour. An overall diameter of approximately six and one half inches, results in a device that saturates at vertical or "sideways" velocities that approached 110 miles per hours. Since this is highly unlikely in any conventional manned aircraft, whether fixed or rotary winged, such overall dimensions appear to be more than adequate for the expected service.

However, forward velocities are expected to be in excess of 112 miles per hour, and accordingly the axial length of the sensor can be adjusted to accomodate virtually any expected velocity by providing an axial dimension of approximately one inch per 100 miles per hour of velocity to be encountered. Velocity in the forward direction will invariably be much greater than velocity in the "reverse" direction, which permits placement of the needle electrodes in a location nearer the "front" of the sensor, thereby providing a greater axial distance for ion displacement.

Thus there has been disclosed, as shown in several embodiments, a fluid velocity sensing system which permits a simultaneous sensing of the three orthogonal components of fluid motion. A substantially linear response is experienced with a small, rugged, easily fabricated sensor device and relatively simple, straightforward electronics. Alternative, multi axis embodiments have been shown. Other modifications and variations will appear to those skilled in the art. For example, a single air sensor could be used in combination with a mount that can orient the sensor to be parallel to the velocity vector and the mount signals the orientation of the sensor relative to the airframe axes. Accordingly, this invention should be limited only by the scope of the claims appended hereto.

What is claimed as new is:

1. Fluid flow meter apparatus for measuring the flow rate and direction of fluids passing therethrough, comprising:
    (a) Fluid ionizing means having a first polarity when energized, in the path of fluid flow located on a first axis and including a substantially point source of ionizing potential;
    (b) Ion collecting means having a second polarity, when energized, located in the path of fluid flow, radially displaced from said ionizing means, said ion collecting means including open structure conductive means having an axis parallel to said first axis to permit fluid to flow therethrough from any direction without essentially altering said fluid flow rate or direction, said ionizing means, when energized in the presence of a fluid, generating a plurality of ions from the fluid stream thereabout in a deflectable distribution, said plurality of ions migrating radially toward said ion collecting means and impinging thereon under a potential gradient created between said energizing ionizing means and said collecting means; and
    (c) Means responsive to the impingement of ions on said ion collecting means, for measuring the displacement of the area of impingement of ions effected by fluid flow, whereby the magnitude and direction of the displacement of the areas of impingement of said migrating ions in the presence of a fluid flow, relative to the areas of impingement of said migrating ions in the presence of a reference flow, is representative of the direction and rate of fluid flow relative to said first axis and axes mutually orthogonal thereto.

2. The apparatus of claim 1 wherein said ion collecting means has at least first and second portions, one of said portions being located upstream of the other relative to fluid flow along said axis, said first and second portions of said ion collecting means being adapted to collect first and second ion currents, respectively, when said ionizing means is energized, in the presence of a fluid.

3. The apparatus of claim 2 wherein said first and second portions of said ion collecting means comprise portions spatially positioned adjacent to each other.

4. The apparatus of claim 2, wherein said ion collecting means comprise substrate means having resistive member means mounted thereon, said resistive member means having first and second end terminals, said first portion of said ion collecting means being defined as the resistive portion between the point of impingement of migrating ions on the resistive member when said ionizing means is energized and said first end terminal, and said second portion of said ion collecting means being defined as the resistive portion between said point of impingement of migrating ions on the resistive member and said second end terminal.

5. The apparatus of claim 4, further including means responsive to the impingement of the ions comprising:
comparison means connected between said first and second end terminals, said comparison means developing output signals proportional to signals present at said first and second end terminals.

6. The apparatus of claim 1, additionally comprising means to vary the potential gradient between said ionizing means and said ion collecting means.

7. The apparatus of claim 1 wherein said point sources of ionizing potential are joined together on a thin electrically conducting rod aligned along said first axis.

8. The apparatus of claim 7 wherein four point sources of ionizing potential are located in a plane orthogonal to said thin electrically conducting rod and said first axis.

9. The apparatus of claim 1 wherein said point sources of ionizing potential are two colinear point sources of ionizing potential aligned with said first axis.

10. The apparatus of claim 1, wherein said open structure conductive means encircles said ionizing means.

11. The apparatus of claim 1 wherein said ion collecting means include a plurality of conductive rings surrounding said fluid ionizing means and arranged to be concentric with said first axis.

12. The apparatus of claim 11, above wherein each of said rings is electrically subdivided into segments of a circle electrically isolated from adjacent segments; said measuring means including resistive means electrically interconnecting the corresponding segments of adjacent rings.

13. The apparatus of claim 1 wherein said ion collecting means include a plurality of conductive rods arranged in parallel with said first axis, and surrounding said fluid ionizing means.

14. The apparatus of claim 13, above, wherein each of said rods is electrically subdivided into first and second portions.

15. The apparatus of claim 1 wherein said open structure conductive means includes means to adjust the spatial orientation of said flow meter apparatus with respect to the direction of fluid flow to allow the fluid to flow through said flow meter apparatus without essentially altering fluid flow rate or direction for determining fluid flow rate relative to said first axis.

16. The apparatus of claim 15 wherein said means to adjust the spatial orientation of said flow meter apparatus comprises driving means to align said first axis with the fluid flow direction to allow the fluid to flow through said fluid flow meter apparatus without essentially altering fluid flow or direction.

17. Apparatus for measuring the rate and direction of fluid flow substantially without disturbance comprising in combination:
(a) fluid ionizing means, including a source of ionizing potential that is substantially a point source located on a first axis and in the path of fluid flow for creating a plurality of ions;
(b) ion collecting means located in the path of fluid flow and spaced apart from said ionizing means, said ion collecting means being substantially transparent to fluid flow therethrough without disturbance to flow rate or direction, said plurality of ions normally migrating toward said ion collecting means when said ionizing means and collecting means are energized to opposite polarities, establishing a potential gradient therebetween; and
(c) detecting means, responsive to impingement of ions on said ion collecting means for signalling the relative location of the area of ion impingement, whereby fluid flow tends to displace the area of ion impingement on said ion collecting means from a predetermined resting area, and the magnitude and direction of displacement is a measure of the direction and rate of fluid flow through the apparatus.

18. Apparatus of claim 17 above, wherein said ion collecting means surround said fluid ionizing means.

19. Apparatus of claim 17 further comprising means for varying the potential gradient between said ionizing means and said ion collecting means for accommodating a wide range of fluid flow rates.

20. The apparatus of claim 17 wherein said ion collecting means include a substantially open, fluid permeable structure having at least one electrically conducting ring surrounding said ion soure.

21. The apparatus of claim 20, above wherein said electrically conducting ring is subdivided into at least two, electrically isolated segments.

22. The apparatus of claim 21, above, wherein each segment is electrically coupled to a supporting rod and is insulated from the other rods and segments.

23. The apparatus of claim 17, above, wherein said ion collecting means include a substantially open, fluid permeable structure having at least one electrically conductive rod.

24. The apparatus of claim 23 above wherein said rod is subdivided into at least two electrically isolated segments.

25. The apparatus of claim 17, above wherein, said ion collecting means include a substantially open, fluid permeable structure having a plurality of conductive rods supporting a plurality of conductive rings, arranged in a generally cylindrical envelope surrounding said fluid ionizing means.

26. The apparatus of claim 17, above, further including mounting means for orienting the position of said ion collecting means to allow fluid flow through the apparatus without altering fluid flow rate or direction, and further including means to signal the orientation of said mounting means.

27. The apparatus of claim 17, above, further including driving means to align said first axes with the fluid flow direction to allow fluid flow through said apparatus without altering fluid flow rate or direction.

28. The apparatus of claim 17, above, wherein said ion collecting means include a substrate member, a resistive member mounted thereon and first and second terminals at opposite electrical ends of said resistive member, the point of ion impingement being determined by the relative magnitude of the ion currents detectable at said first and second terminals.

29. The apparatus of claim 17, above, wherein said fluid ionizing means source of ionizing potential includes two colinear electrodes aligned with said first axis.

30. The apparatus of claim 17, above further including electrical means for shifting the location of said predetermined resting area.

31. The apparatus of claim 17, above, wherein said fluid ionizing means include a point source of ionizing potential supported by an electrically conducting rod coaxial with said first axis.

32. Apparatus of claim 17, above, including signal processing means coupled to receive ion currents from said ion collecting means for signalling fluid flow rates resolved along desired mutually orthogonal axes.

33. Apparatus of claim 17, above, including signal processing means for generating a feedback signal for application to a source of potential, whereby total ion current can be kept constant.

34. A method of measuring the rate and direction of fluid flow, resolved along predetermined mutually orthogonal axes, comprising the steps of:
 (a) ionizing a fluid having a reference flow rate and direction relative to the predetermined axes;
 (b) creating a potential gradient field between a central source and a surrounding ion collecting structure that is essentially transparent to fluid flow and sufficient to produce ion migration rates substantially greater than anticipated fluid flow rate components in the directions of ion migration;
 (c) locating an area of ion impingement on said ion collecting structure resulting from a reference fluid flow rate and direction by measuring the ion currents generated thereby;
 (d) ionizing a fluid having an unknown flow rate and direction;
 (e) recreating the potential gradient field of step b;
 (f) locating an area of ion impingement for the fluid flow of unknown rate and direction by measuring the ion currents generated by such fluid flow; and
 (g) utilizing the displacement of the ion impingement area by processing the ion currents to create signals representative of the fluid flow rate along each of the predetermined axes.

35. The method of claim 34, above wherein the creating step includes the creation of more than one gradient field, each field existing between the central ion source and an electrically isolated portion of the surrounding ion collecting structure, whereby separate ion currents are generated, each corresponding to the impingement of migrating ions deflected by fluid flow on the corresponding portions of said ion collecting structure.

36. The method of claim 35, above wherein the utilizing step includes the processing of all ion currents to determine flow rate in a predetermined direction relative to the ion collecting structure.

37. The method of claim 35, above wherein the utilizing step includes the establishment of a directional axis along which flow rate is to be resolved and the step of comparing ion currents from that portion of said ion collecting structure that is on one side of a plane orthogonal to said directional axis and which passes through the central ion source, with ion currents from the remaining portion of said ion collecting structure.

* * * * *